(12) United States Patent
Hughes

(10) Patent No.: US 6,740,886 B1
(45) Date of Patent: May 25, 2004

(54) APPARATUS AND METHODS FOR INVESTIGATION OF RADIOACTIVE SOURCES IN A SAMPLE

(75) Inventor: Karl Anthony Hughes, Cumbria (GB)

(73) Assignee: British Nuclear Fuels PLC, Warrington (GB)

( * ) Notice: Subject to any disclaimer, the term of this patent is extended or adjusted under 35 U.S.C. 154(b) by 0 days.

(21) Appl. No.: 09/889,173
(22) PCT Filed: Nov. 1, 2000
(86) PCT No.: PCT/GB00/00008
§ 371 (c)(1), (2), (4) Date: Oct. 10, 2001
(87) PCT Pub. No.: WO00/42446
PCT Pub. Date: Jul. 20, 2000

(30) Foreign Application Priority Data

Jan. 11, 1999 (GB) ............................................. 9900448
Jan. 11, 1999 (GB) ............................................. 9900449

(51) Int. Cl.$^7$ ............................................. G01T 1/167
(52) U.S. Cl. ..................... 250/393; 250/394; 382/128
(58) Field of Search ................................. 250/393, 394, 250/363.04, 358.1, 360.1, 252.1, 370.01, 506.1, 386.1; 382/128, 131, 731

(56) References Cited

U.S. PATENT DOCUMENTS

| | | | | |
|---|---|---|---|---|
| 5,155,365 A | * | 10/1992 | Cann et al. | 250/363.02 |
| 5,274,239 A | * | 12/1993 | Lane et al. | 250/370.01 |
| 6,310,968 B1 | * | 10/2001 | Hawkins et al. | 382/131 |
| 2002/0125439 A1 | * | 9/2002 | Caldwell et al. | 250/395 |
| 2002/0175288 A1 | * | 11/2002 | Taleyarkhan | 250/358.1 |

FOREIGN PATENT DOCUMENTS

| JP | 62-91879 | 4/1987 |
|---|---|---|
| WO | WO 00/42447 | 7/2000 |

OTHER PUBLICATIONS

"Standard Test Method for Nondestructive Assay of Special Nuclear Material in Low–Density Scrap and Waste by Segmented Passive Gamma–Ray Scanning," Sep. 1996, American Society for Testing and Materials.

"Standard Test Method for Nondestructive Assay of Special Nuclear Material in Low Density Scrap and Waste by Segmented Passive Gamma–Ray Scanning," Nov. 1989, American Society for Testing and Materials.

Parker et al., "Transmission Measurement Correction for Self–Attenuation in Gamma–Ray Assays of Special Nuclear Materials," 1976, Nuclear Materials Management.

* cited by examiner

Primary Examiner—Constantine Hannaher
Assistant Examiner—Otilia Gabor
(74) Attorney, Agent, or Firm—Beyer Weaver & Thomas LLP

(57) ABSTRACT

The invention provides an improved correction technique for use in analysing bodies of material containing radioactive sources. In particular the invention provides apparatus and a method, the method comprises a method of investigating radioactive sources in a body of material provided at an investigation location, the body of material comprising a plurality of samples, the method comprising detecting a portion of the emissions arising from a sample, the detested portion relating to a detected level, the detected level being corrected according to a correction method to give a corrected level, the method being repeated for one or more of the other samples, the correction method for one or more of the samples comprising providing a generator of radioactive emissions and detecting the radioactive emissions from the generator with the sample at investigating location, the relationship of the emissions detected with the sample at the investigating location to the emissions which would be detected with the sample absent from the investigating location determining a characteristic of the sample, the determined characteristic being employed as a factor in the correction method used for that sample to obtain the corrected level.

17 Claims, 2 Drawing Sheets

APPARATUS AND METHODS FOR INVESTIGATION OF RADIOACTIVE SOURCES IN A SAMPLE

This invention is concerned with improvements in and relating to apparatus and methods for materials investigations. The invention is particularly, but not exclusively, concerned with investigating gamma ray emissions from materials. The invention is still more particularly, but not exclusively, concerned with correction techniques in such investigations and the provision of a new correction technique.

In a variety of situations it is necessary to investigate emissions from radioactive sources in or on materials to form a basis for a variety of subsequent decisions, actions or further considerations. The investigations of the samples may relate directly to the emission, for instance the emission source, or indirectly, for instance the consideration of associated non-emitters or emitters which are not directly measurable. The emissions of interest are in particular gamma ray emissions, but other emission forms may be considered additionally or alternatively.

Emission investigation is particularly important in waste evaluation cases. For a given waste sample it is desirable to be able to determine a variety of unknowns. The unknowns may include, but are not limited to, one or more of the level, type, constituents, nature and distribution of the emissions, emission sources, associated materials or associated factors.

When taking measurements of the radioactive waste contained in a sample using prior art techniques it is necessary to make a number of assumptions to gain a solvable system. One such assumption for certain correction techniques is that the materials are homogeneously distributed within a body or container and, in particular that the density profile of the material within the container is even. Given the various materials encountered and the varying size and shape of the materials potentially making up the waste this is not a truly valid assumption. Further variations occur in practice as materials settle or move over time, for instance during transportation.

Relevant correction techniques accept this assumption and are qualified by an error level as a result. For safeguard reasons the level of radioactive sources in a sample should be determined as accurately as possible. In safety cases the error requires that the level be placed at the worse case level. As a consequence the level of radioactive sources is frequently over estimated, with consequential complexity of further handling or storage, as well as cost penalties.

The present invention seeks, amongst other aims, to provide a technique in which greater account of variations or potential variations in density are taken. The improved account may be used in accounting for the effects of the material on the emissions as detected.

According to a first aspect of the invention we provide a method of investigating radioactive sources in a body of material provided at an investigation location, the body of material comprising a plurality of samples, the method comprising detecting a portion of the emissions arising from a sample, the detected portion relating to a detected level, the detected level being corrected according to a correction method to give a corrected level, the method being repeated for one or more of the other samples, the correction method for one or more of the samples comprising providing a generator of radioactive emissions and detecting the radioactive emissions from the generator with the sample at the investigating location, the relationship of the emissions detected with the sample at the investigating location to the emissions which would be detected with the sample absent from the investigating location determining a characteristic of the sample, the determined characteristic being employed as a factor in the correction method used for that sample to obtain the corrected level.

The body of material may be free standing, but is preferably contained in a container. The sample may include the part of the container associated with that part of the body of material.

Preferably the sample is a portion of the body of material which extends from one side of the body through to the other. The sample may be a segment or slice through a body of material, preferably a segment or slice which extends outwards to the limits of the body of material in two dimensions. Preferably the sample is taken horizontally through the body of material. Preferably the sample has substantially the same thickness throughout the body of material. Preferably the thickness of the sample is its depth.

The samples may be investigated in order, for instance from one end of the body of material to the other.

Preferably the generator of emissions is a radioactive source provided externally of the position occupied by the container and/or body of material in use. Preferably the generator is provided in opposition to the detectors therefore.

The relationship of the emissions detected with the sample at the investigating location to the emissions which would be detected with the sample absent the investigating location may be the ratio of the respective count rates for the detectors. Preferably the emissions leaving the generator count rate is determined in the absence of the sample. The absence may be an absence of any body of material in the investigating location. The relationship may be based on the ratio $R/R_o$, where R is the rate at which the emissions are detected with the sample in place and $R_o$ is the rate of emissions which would be detected without the sample in place. Preferably the relationship is based on, and ideally equates to $-\ln(R/R_o)$.

Preferably the characteristic determined is a function of the density of the sample and preferably the density of the sample. The characteristic may be a function of the effective amount of material in the sample. The characteristic may relate to the effective amount of material determined to be in a sample relative to one or more other samples.

The determination of the characteristic for one or more or all of the samples may be based on the interrelationship of a plurality of potential variables. Preferably the variables include one or more of, and most preferably all of:

I) the relationship of the emissions which would be detected without the sample present to the emissions detected with the sample in place, more preferably the relationship of R and $R_o$, where R is the rate at which the emissions are detected with the sample in place and $R_o$ is the rate of emissions which would be detected without the sample in place;

ii) the attenuation effects of the sample, more preferably $\mu$, where $\mu$ is the mass attenuation coefficient;

iii) the path of the emissions through the sample, more particularly, x, where x is the thickness of the sample (between source and detector);

iv) the density of the sample, $\rho$.

Preferably the determination of the characteristic is based on the equation:

$$R = R_o \exp(-\mu \rho x)$$

where the symbols have the meanings referred to above.

Preferably under the conditions of the investigation x and/or μ, and most preferably both are substantially constant. Preferably x is kept constant by fixed relative generator, detector and sample positions (the sample may rotate without affecting this). Preferably μ is substantially constant due to the energy of the generator emissions. An energy of greater than 400 keV, preferably greater than 1000 keV and ideally greater than 1300 keV may be used. Preferably the source is as detailed in the British Nuclear Fuels PLC UK Patent Application no. 9900449.1 filed 11 Jan. 1999 and referenced P17454, the contents of which are incorporated by reference. In particular we may provide a method of investigating radioactive sources in a sample, the method comprising detecting a portion of the emissions arising from the sample, and further comprising the provision of a radioactive generator, passing at least a portion of the emissions of the generator into the sample, detecting at least a portion of the emissions from the generator leaving the sample, the radioactive generator emissions being of at least a plurality of emission energies and at least two of those energies being detected.

Preferably the method further provides that the detected portion of the source emissions relate to a detected level for the sources in a sample, the detected level being corrected according to a correction method to give a corrected level for the sources in a sample, the process being repeated for one or more other samples.

Preferably the correction method employs measured transmission coefficients in determining the correction. The measured transmission coefficients, for one or more of the energies, most preferably all, may be provided according to the equation:

$$\text{Trans. Coeff.} = \frac{R}{R_o}$$

where R is the rate of detected photons with the sample in place, $R_o$ is the rate of photons which would be detected without the sample in place.

Preferably the density determined is used as a factor in the correction method. The density used in the correction method may be an averaged density from the determinations or a weighted average density from the determinations.

For correction of source emission energies corresponding to a generator energy preferably the measurement based correction factor is used. For correction of source emission energies not corresponding to a generator energy preferably the correction factor is based on the extrapolation of the correction factors based on the measurements.

The generator is preferably a single isotope. Preferably the emission energies extend across a substantial portion of the range of energies emitted from the sample. A substantial portion may be 50%, preferably 75%, more preferably 90% and ideally 100% of the sample energies range. The generator most preferably of all emits energies encompassing the range of energies emitted by the sample. $^{152}$Eu is a particularly preferred generator. Preferably at least 5 energies from the source are detected and used, more preferably at least 8 energies are detected and used.

Preferably the portion of generator emissions detected have passed through the sample. Preferably the generator is provided on the opposing side of the sample to the detectors, most preferably in direct opposition.

One or more of the detectors for the sources may be used for detecting the generator emissions and/or vice-versa.

We may also provide apparatus for investigating radioactive sources in a sample, the apparatus comprising:

one or more detectors for emissions from the sources, the detectors generating signals indicative of the emissions detected;

an investigating location into which the sample is introduced;

signal processing means for relating the detector signals to one or more characteristics of the sources;

a radioactive emission generator separate from the sample; and one or more detectors for emissions from the radioactive generator leaving the sample;

wherein the radioactive generator emissions are of at least a plurality of energies and a least two of the plurality of energies are detected.

The source detectors and the generator detectors may be one and the same in the case of one or more or all of the detectors.

Preferably the amount of material in a sample is a function of the effect on transmission of generator emissions by that sample, the total amount of material being proportional to the effects of all the samples, the fraction of the total material in a particular sample being a function, preferably a ratio, of that sample's effect on transmission to the sum of all the effects. The effect on transmission of a sample may be given a numerical value, the amount of material in that sample, and/or its mass, being defined as the numerical value for that sample divided by the sum of the numerical values for all the samples, multiplied by the total mass. A density value for each sample may be made in this way by virtue of the known volume of the sample.

Preferably the amount of material in a sample, Vs, is made proportional to the ratio of R to $R_o$, and more preferably is based on, and ideally equates to: $-\ln(R/R_o)$. In this way the total amount of material in the body of material is proportional to the sum of each sample amount, ΣVs. Preferably the fraction of the body of material in a given sample is Vs/ΣVs.

Preferably the characteristic is determined based on a number of variables including one or more of, and ideally all of,:

I) the total mass of the body of material, M;

ii) the total volume of the body of material, V;

iii) the total number of samples forming the body of material, N;

iv) the amount of material in a given sample, Vs;

v) the sum of all the values proportional to the amounts of material in the sample volumes, ΣVs;

vi) the density of the sample.

Preferably the characteristic is determined based on the equation:

$$\rho = (N.M/V) \cdot (Vs/\Sigma Vs)$$

Preferably the characteristic, and particularly the density is used in correcting the detected level to the corrected level, for instance by established subsequent techniques, such as those set out in the Los Alamos primer, 2nd Edition, March 1991, ISBNO-16-032724-5.

According to a second aspect of the invention we provide apparatus for investigating radioactive sources in a body of material, the body of material comprising a plurality of samples, the apparatus comprising:

one or more detectors for emissions from the sources, the detectors generating signals indicative of the emissions detected;

an investigating location into which the sample is introduced;

signal processing means for relating the detector signals to a detected level for the sources;

processing means providing a correction method for correcting the detected level for the sources to give a corrected level;

the apparatus further comprising:

a generator of radioactive emissions, at least of portion of the emissions entering the investigating location and, in use the sample;

one or more detectors for detecting the generator emissions with the sample at the investigating location;

processing means for determining a characteristic of the sample based on the relationship of emissions detected with the sample at the investigating location to emissions which would be detected with the sample absent, the characteristic being employed by the processing means as a factor in the correction method used for that sample to obtain the corrected level.

The source emission detectors and the generator emission detectors may be the same in one or more or all cases.

The signal processing means and/or processing means for the correction method and/or processing means for the determined characteristic may be one and the same.

The second aspect of the invention may include any of the features, options and possibilities set out on the first aspect of the invention, including apparatus suitable for the implementation of the method steps detailed therein.

The first and/or second aspects of the invention may further include any of the features, options, possibilities and steps set out below.

The sources may be singular or plural in disposition and/or type. The sources may be one or more isotopes of one or more elements. The sources may be alpha and/or beta and/or gamma emitters, but are preferably gamma emitters at least.

One or more sources of the same type and/or of different types may be present in the sample. The sources may be homogeneously distributed, or more usually, unevenly distributed. The size and/or shape and/or mass of a source may be different from the size and/or shape and/or mass of another source in the sample, be they of the same or different types.

The sources may be investigated by detecting one or more of their emitting energies. Thus a characteristic energy of an isotope may be detected.

The sources may be investigated directly, for instance they contribute directly to the detected level, and/or the sources may be investigated indirectly, for instance they do not contribute directly to the detected level but are associated with sources which do.

The samples may be gaseous and/or liquid and/or solid. The samples may contain one or more non-emitting or non-source materials. The materials may include one or more of metals, such as iron, steel, aluminum; wood; glass; plastics, such as Polythene, PVC; liquids, such as water.

The container preferably entirely encloses the body of material. The container may be of metal or of concrete or a combination of such materials. Drums are a particularly preferred container, such as right cylindrical drums.

The containers may be of one or more standard sizes. The height and/or diameter of the containers may be standard.

Preferably the containers introduced to the investigating location one at a time. The containers may be introduced by conveying along a surface, preferably a horizontal surface.

The surface may include or be formed of a plurality of rollers. Preferably the container is removed from the investigating location in a manner equivalent to its, introduction.

The investigating location is preferably provided in proximity to the emission detector or detectors. The investigating location may be provided in proximity to one or more radioactive sources. The sources are preferably intended to transmit radiation through the sample. Ideally the investigating location is provided between the detector(s) and the transmission source(s).

The sample, preferably the container for it, may be rotated at the investigating location. Preferably the rotation presents different portions of the sample in proximity to the detectors and/or transmission source(s), the rotation may be continuous or stepped. The rotation may be provided at between 5 and 25 rpm.

Preferably the sample and/or body of material and/or container are weighed at the investigating location, for instance by the turntable used to rotate it.

The sample, preferably the container for it, may be raised and/or lowered at the investigating location. Preferably the rasing and/or lowering presents different portions of the sample to the detector(s) and/or transmission source(s), the raising and/or lower may be continuous or stepped. Preferably investigations are performed as the sample is lower and raised.

The sample may be rotated and/or lower and/or raised.

A single detector may be used. Preferably a plurality of detectors, for instance three, may be used.

The detectors may be of the high purity germanium type.

Preferably the detectors are collimated to restrict their field of view to the body of material of which the sample is the whole or a portion thereof. Where the sample is less than the whole of the body of material, preferably the detectors are collimated to restrict their field of view to the sample only. The sample is preferably a slice or segment of the whole. The segments may be of the same thickness.

Preferably the detected level is obtained from a passive counting stage. Preferably the transmission based investigations are performed before and/or after the passive count stage.

Preferably the transmission source(s) is provided in opposition to the detector(s). Preferably the same number of transmission sources are provided as there are detectors. It is particularly preferred that the transmission source be provided according to the nature of the transmission source detailed in British Nuclear Fuels PLC UK Patent Application no. 9900449.1 detailed reference P17454 filed on 11 Jan. 1999 and as detailed above.

One or more surface dosimeters may be provided. Preferably the surface dosimeters are configured to investigate gamma emitting sources. Alpha and/or beta emitting sources may alternatively or additionally be investigated.

Various embodiments of the invention will now be described, by way of example only, and with reference to the accompanying drawings in which.

Figure 1:
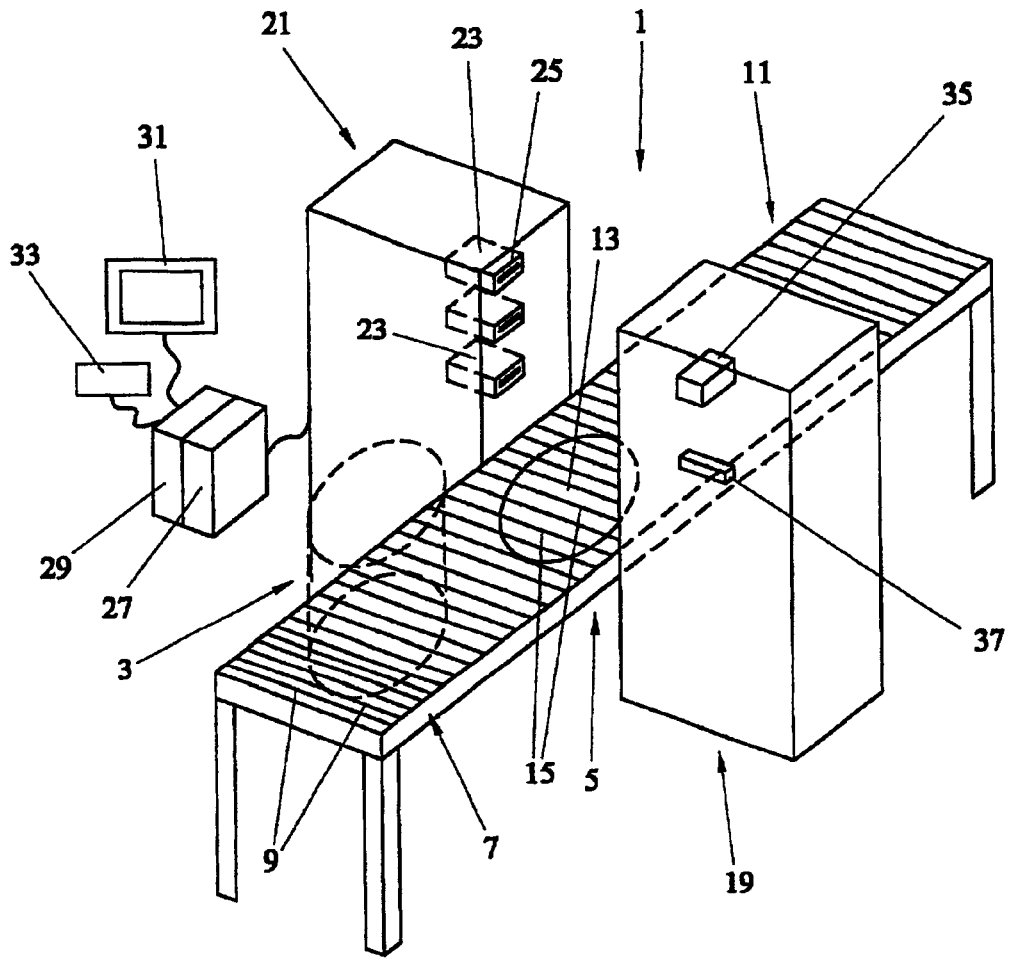
FIG. 1 illustrates schematically an instrument suitable for implementing the present invention.

The instrument illustrated in FIG. 1 is suitable for investigating gamma emission sources in a variety of situations and materials. The system 1 is particularly designed to investigate waste samples presented in drums 3 to investigating location 5.

The drums considered may be in a variety of sizes, but the instrument is readily adapted to consider 100, 200 and 500 litre drums. Masses of waste, such as 40 kg to 550 kg, can readily be accommodated.

The drums 3 may be provided with a barcode which can be examined by a barcode reader on the system 1 so as to permanently assign results obtained to that drum 3.

The system 1 features a conveying table 7 formed of a large number of parallel rollers 9, onto which the drums are lowered. Cranes, forklift trucks and other lifting and manoeuvring means can be used to this end.

The conveying table 7 leads to the investigating location 5 and then onward out the other side to a dismounting location 11 from which the drums 3 are lifted. This set up allows the flow of samples for investigation through the system.

The drum 3 is supported at the investigating location 5 by a turntable 13 which again is formed by a number of parallel rollers 15 mounted on a moveable frame 17. The frame 17 can be rotated about a vertical axis, using a motor (not shown), so as to rotate the drum 3 about its longitudinal axis at the investigating location 5. A rotational rate of 12 rpm is preferred, but stepped rotation can be used. The frame 17 can also be provided with the option of being raised and lowered relative to the level of the surrounding conveying table 7, using electrical drives, hydraulics or other systems (not shown), so as to adjust the vertical positioning of the drum 3 within the investigating location 5. The lowering and rotating motions may be applied simultaneously.

The turntable 13 and frame 17 are configured to weigh the drum 3 whilst it is on the turntable 13.

On either side of the investigating location 5 are investigating assemblies 19, 21. In general one of these assemblies 19 acts as the, optional, transmission side and the other 21 as the detecting/receiving side for the investigations.

The detecting/receiving side 21 provides one or more detectors 23 for the emission type under consideration. The detectors 23 are collimated using shields 25 to give a restricted field of view into the investigating location 5 for each detector 23. Through the use of variable aperture collimators (not shown) the range of radioactivity level for the waste which can successfully be handled is increased. The field of view is generally configured to be a slice through that investigating location 5, the slice being substantially parallel to the turntable 13 and/or perpendicular to the axis of the drum 3 under consideration.

For gamma rays the detectors may be of the germanium type, for instance high purity germanium detectors. LRGS or HRGS detectors may be used, with electrical or LN$_2$ cooling for HRGS detectors.

The provision of more than one detector, collimated to different fields of view, allows a greater number of measurements to be taken simultaneously, hence increasing the throughput for the system.

The detectors 23 monitor gamma rays originating in their field of view in the drum 3 and in effect generate count rates. A count time of less than 30 minutes is generally employed.

The signals obtained from the detectors are fed to processing electronics 27 and hence to a CPU 29 and operator display 31. Operator control and inputs are facilitated through-keyboard 33.

The processing electronics 27 are provided with error handling functions and diagnostic facilities, as well as providing the appropriate calibration functions.

Processing of the signals gives detailed information on the assay of waste material in the drum 3, the isotopic make-up of the waste. More details of these analyses are discussed below. The results can be used to classify waste according to the relevant disposal categories, including those below a deminimus level which can be characterized as non-radioactive. The results can be expressed as the identification of fission products, activation products or MGA code. The results can also be combined with the "fingerprinting" technique to give non-measurable isotope determinations.

The results obtained can be improved using a variety of potential correction techniques. Correction based on weight and/or differential peak adsorption and/or use of a transmission source may be used. In this invention the new correction techniques detailed in the same applicant's UK Patent Applications designated P17454 filed on 11 Jan. 1999 may also be used and details of those techniques are fully incorporated herein by reference. In particular to address certain problems the technique employs a multi-energetic source as the transmission source for sample investigation. The sources used are carefully selected to provide energies spanning the important part of the spectrum for a number of commonly encountered waste types. The source material is exemplified by $^{152}$Eu. The intention is to provide a series of transmission based investigations which bracket the emissions from within the sample itself. Thus a more appropriate correction factor can be calculated for the sample in question and its actual emission energies as the deviation of those energies from the energies at which the transmission effects are actually measured and known are significantly reduced.

The overall effect of the multi-energy source is that the correction is more accurate and the likely error is reduced.

The actual correction is obtained from the measured transmission coefficients, which at the respective energies are:

$$\text{Trans. Coeff.} = \frac{R}{R_o} = \exp(-\mu\rho x)$$

where R is the rate of detected photons, $R_o$ is the rate of emitted photons from the source, $\mu$ is the mass absorption: coefficient, $\rho$ is the matrix density, x is the matrix thickness.

Measured transmission coefficients for two different samples with significantly different make-ups, at the various energies given by $^{152}$Eu, would give rise to significant variation with energy between the two samples, a variation which would not be apparent from a single investigation at using transmission correction based on a single energy.

Between the greater number of actually measured values provided by the new technique, an extrapolated value can be used. The greater number and range of the measured values make this extrapolation more accurate too.

Furthermore, the other correction technique of GB 9900449.1 may be used. In this technique the material forming the sample is assumed to be made up of three or more elements in unknown ratios. The transmission coefficient at energy i is the sum of the exponential terms for each of the constituents, i.e. for j terms. The definition is:

$$T_{nj} = \exp\left(-\sum_j q_j u_{ij}\right)$$

where $q_j$ is the effective matrix thickness for material j and $\mu_{ji}$ is the mass absorption coefficient for material j at energy i.

Three or more materials can be used in the determination, but it is preferred that one low atomic number, one mid atomic number and one high atomic number constituent at least be used (i.e. low Z, mid Z and high Z elements). The elements may be hydrogen (low), aluminum (mid) and iron (high), for instance. It should be noted that the material selected need not be a constituent of the sample for the technique to work.

Using this formula transmission coefficients can be calculated by varying the $q_j$ values. The variations are aimed at minimizing the sum of the residuals from a comparison of the measured and calculated/fitted coefficients. The fitting may be a linear least squares approach (matrix solution) or cycling through the possible q values. Once minimized a set of $q_j$ values are reached which can be used to calculate accurately the transmission coefficient at any desired energy i.

In effect the technique assigns a fixed proportion of each composite material to best describe the unknown elemental composition of the sample. The result is an accurate transmission coefficient at any energy and hence full correction at any energy.

Through the use of a transmission source or sources 35 on transmission side 19 in combination with stepped rotation of the drum 3 tomographic style investigations of the drum can be made to give plots of density distribution and radioactive distribution for the drum 3.

Surface originating alpha and/or beta emissions, and most preferably gamma emissions, for the drum 3 can also be measured using optional dosimeters 37. The dosimeters are normally provided on the transmission side 19 in proximity with the surface of the drum 3.

As discussed above three different known correction techniques (one of which may be in the improved form detailed above) may be deployed. The principles and operation behind each of these known forms is now discussed.

Weight based correction seeks to account for the attenuating effects of the body of material the sources are in by a factor based on the body of materials density. The total mass of the entire body of material is divided by the total volume of the body of material, more commonly the total volume of the container for the body, to give an overall density value for the entire body/container. This single value is then used in the correction of the detected count to account for the reduction arising due to attenuation.

Differential peak absorption based correction again seeks to account for the attenuation effects of the material, but through a more direct investigation of attenuation. The gamma emissions from a source anticipated to be in the body of material at two characteristic energies are considered. The ratio of the emissions at one energy to the emissions at the other energy is known (1:1, for instance, for Co-60) without attenuating materials, and this base ratio is compared with the actual ratio measured with the attenuating effects of the body of material present to give a factor relating to the attenuating effect and hence allowing correction.

Transmission source based correction comes in a variety of forms, but each is generally based on determining attenuation effects on emissions from within the body of material by measuring the attenuation on externally sourced gamma emissions. Emissions at a known energy from the transmission source are detected after their passage through the body. The ratio of the detected emissions with the body of material present is compared with the detected emissions which would occur without the material. The attenuation is corrected for based on this difference. The energy of the transmission source is selected to be close to the energy of the emissions from the sample which need correcting.

Whilst the above mentioned correction techniques are all useful in addressing a number of areas of potential error or variation in the results, a number of assumptions are still applied in reaching the calculated results from the measured information.

One of the particular areas of concern is the assumption that the density profile of the material in a container or drum under consideration is even. That is to say the density of the top portion of the drum is the same as the middle of the drum and is the same as the bottom of the drum.

Clearly the material, such as waste, introduced into a container will in many cases not be the same throughout the filling process. Even within the same general type of material variation occurs, for instance the size of the pieces and hence how they fit together within the drum. In many case different materials will be introduced at different times as the drum fills, potentially with those materials having different densities from one another. Additionally the materials may have different properties, for instance fluids will tend to flow downward and occupy the lower part of a drum fully, whilst potentially leaving voids in the upper part of the drum. Still further problems occur in the case of only partially filled drums where a substantial void exists at the top of the drum as a result.

As a wide variety of variations in the density profile are likely to be encountered in practice, the prior art technique of weighing the drum and dividing that mass by the volume of the standard drum size in question, to give a single density value averaged for the whole drum is clearly a source of potential error in all cases and actual error in almost all cases.

The correction technique of the present invention aims to combine weight measurements for the drum with transmission based measurements for the drum in a meaningful manner to address the issue of accurate correction.

The technique is based on considering the contents of the drum as a number of distinct parts, for instance horizontal segments through the drum, each of the segments being treated separately from the others in terms of its density value. By treating the drum as a number of potentially different density parts the errors referred to above are substantially removed. This division of the drum into segments and allocation of a density value to each segment cannot be made based on the weight of the drum alone.

To achieve the aim the technique evaluates the amount of material in a given segment by means of transmission source based investigations.

If $R_o$ is the rate at which photons from an external source are detected in the absence of the drum and R is the rate of detection of those photons with the drum present then:

$$R = R_o \exp(-\mu \rho x)$$

where $\mu$ is the mass attenuation coefficient, $\rho$ is the density of the sample and x is the thickness of the matrix.

For any given drum x will be constant as this is the path length through the drum (56 cm for a 200 litre drum, for instance). At high gamma energies, say greater than 400 keV, $\mu$ can be treated as effectively constant too. Experimental demonstration of this is provided below. In effect these valid assumptions make $\rho$ proportional to $-\ln(R/R_o)$.

For a given segment or slice, s, through the drum, the amount of material in that slice, $V_s$, is assigned the value $-\ln(R/R_o)$. The total amount of the material present in the drum is thus defined as proportional to $\Sigma V_s$; the sum being for all the slices of the drum.

Following this definition, the fraction of the whole body of material in a given slice, $s_1$, is given by $V_{s1}/\Sigma V_s$. As the total mass of the drum is known (from weighing), as the total volume of the drum is known (from measurement or as a standard size) and as the number of segments into which the drum has been divided is known (from the analysis control), then the density is defined as:

$$\rho(N.M/V) \cdot (V_s/\Sigma V_s)$$

The provision of more accurate density information specific to each slice allows more accurate attenuation correction for that slice and hence greater overall accuracy.

The above mentioned technique was tested experimentally in two separate sets of experiments.

In the first set a series of homogeneous drums were scanned in position on the turntable of the type of instrument described above in relation to FIG. 1. The scan was performed in 12 segments, in each case the drum was presented on a carrying puck which in effect equated to the 11 segment, with the 12 segment equating to the turntable itself and with the first segment being above the top of the drum.

Figure 2:
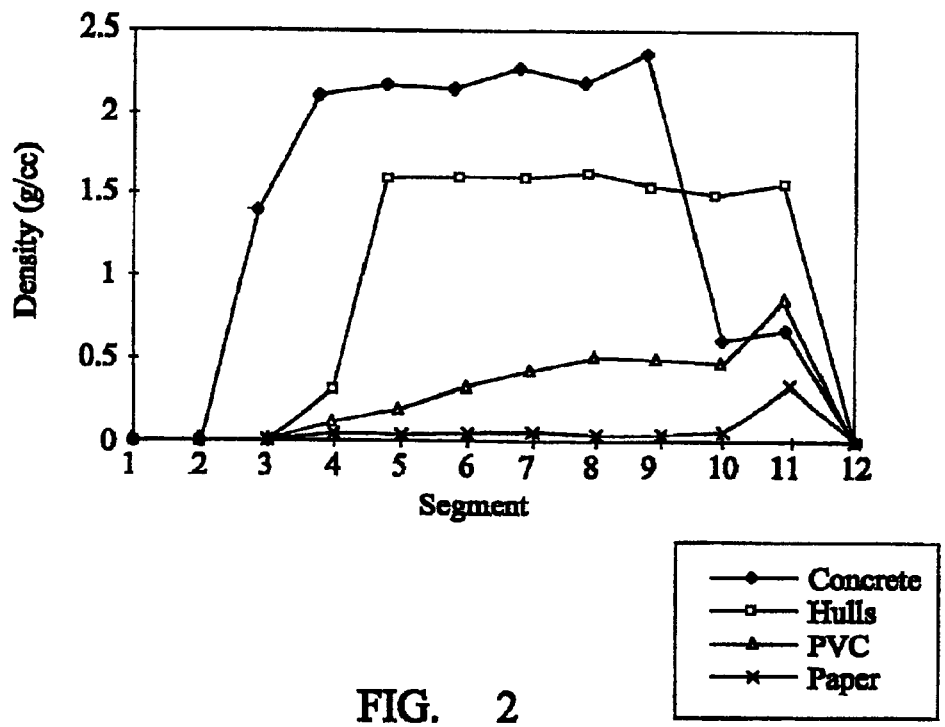
FIG. 2 shows the density measurements obtained during scans of an instrument employing the technique of the present invention, on four constructed, nominally, homogeneous material.

The results from this set of tests for a concrete, a hulls, a PVC and a paper carrying drum are set out in FIG. 2.

The results clearly show the change in density determined before the drum is reached, segment 1, as the puck is reached, segment 10 and the turntable, segment 11.

More importantly the measurements reveal that the PVC drum is not as homogeneous as thought.

Table 1 summarizes the density measurements derived from an assumption of homogeneous material and those calculated by the transmission/weight correction based technique. Good agreement for all the densities of material was achieved.

TABLE 1

| MATRIX | KNOWN DENSITY | TRANS/WEIGHT DENSITY |
|---|---|---|
| Paper | 0.066 +/− 0.004 | 0.054 +/− 0.008 |
| PVC | 0.45 +/− 0.02 | 0.46 +/− 0.05 |
| Hulls | 1.47 +/− 0.07 | 1.49 +/− 0.04 |
| Concrete | 2.10 +/− 0.10 | 2.12 +/− 0.08 |

Figure 3:
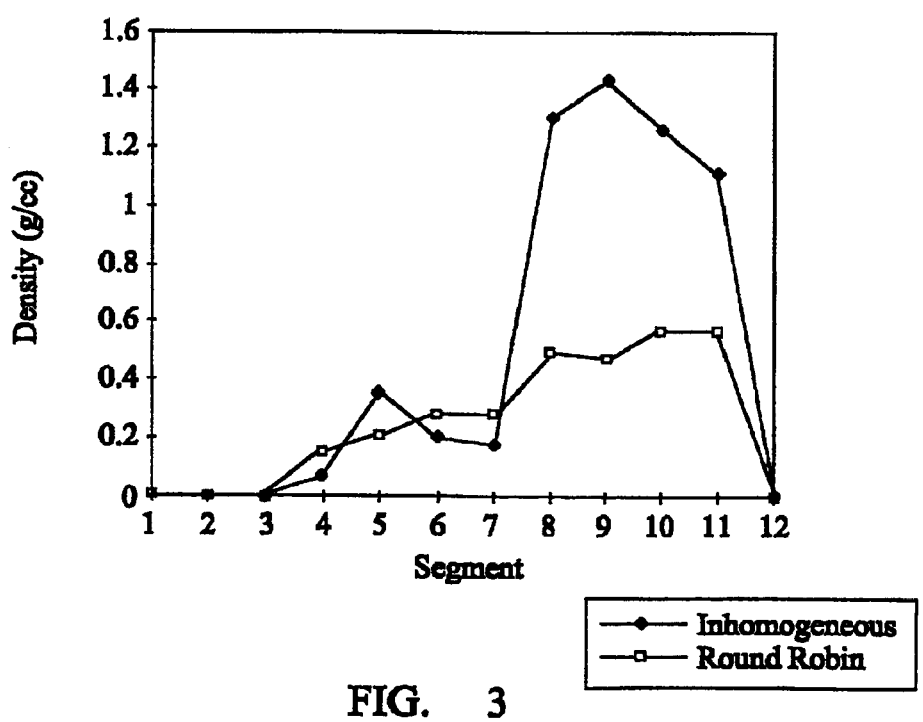
FIG. 3 shows a density measurement obtained during a scan of an instrument employing the technique of the present invention, on a constructed non-homogeneous material.

The ability of the technique to pick up the variations in density is still more apparent from the second set of tests. The results of these test are illustrated in FIG. 3 with regard to a deliberately non-homogeneous drum. The drum was constructed, working up from the bottom, from rubble (most dense), from paper and PVC (least dense) and was topped off with bottles of water (intermediate density).

The figure clearly illustrates that the technique picks out each of these densities in turn.

The more accurate density measurements can be used to correct the processing of the results of the detectors to give a better resolution of the level of radioactive material within the waste. The density measurements could additionally or alternatively be used in the other correction techniques to improve them too.

When under taking a transmission/weight based correction of this type the selection of an appropriate transmission source is important. A transmission source of the type described in the British Nuclear Fuels UK Patent Application no. 9900449.1 filed on the same date as this initial application, under reference no. P17454 and detailed above, is particularly suitable and the contents of that application are incorporated herein in that regard.

In general the source should be selected to have a highly penetrating gamma energy (for instance, in the range 1000 to 2000 keV) and preferably be of high branching fraction. Use of such energy level sources ensures that the assumption that u is constant remains a valid one. The lack of variation of $\mu$ between materials is clearly illustrated in Table 2, at an energy of approx. 1500 keV.

TABLE 2

| MATERIAL | $\mu$ (g.cm$^{-2}$) |
|---|---|
| Iron | 5.02E−2 |
| Lead | 5.27E−2 |
| Magnesium | 5.29E−2 |
| Sand | 5.35E−2 |
| PVC | 5.49E−2 |
| Water | 5.94E−2 |
| Polythene | 6.11E−2 |
| AVERAGE | 5.50E−2 |

The penetrating power of the transmission source is also important as this is a limiting factor on the density range which can be accommodated by the present technique.

Table 3 sets out the fraction of photons which will penetrate a 56 cm diameter drum, with $\mu$=5.25E−2 g.cm$^{-2}$, for a variety of material densities between 0 and 3.0 g.cm$^{-3}$. The count rate for the detector and associated precision for a 15 minute each way assay with 12 segments (i.e. 75 seconds per segment) is shown too.

| DENSITY (g.cm$^{-3}$) | FRACTION TRANSMITTED | COUNT RATE | COUNTS IN 75 SEC. | 1 SIGMA ERROR ON 75s COUNT (%) |
|---|---|---|---|---|
| 0.0 | 1.0 | 893 | 67000 | 0.4 |
| 0.5 | 0.23 | 205 | 15400 | 0.8 |
| 1.0 | 0.053 | 47.3 | 3550 | 1.7 |
| 1.5 | 0.012 | 10.7 | 800 | 3.5 |
| 2.0 | 0.0028 | 2.50 | 188 | 7.3 |
| 2.5 | 0.00064 | 0.57 | 43 | 15 |
| 3.0 | 0.00015 | 0.13 | 10 | 32 |

Based on this approx. 1500 keV source densities up to 2.5 g.cm$^{-3}$ (above the upper level of most samples encountered in practice) could be successfully addressed. Increased penetrating power and increased count times could raise the density level still further.

As demonstrated above the technique offers improved performance and accuracy of results, whilst being applicable to a wide variety of waste types, including partially filled drums and the hardest wastes normally encountered, those of high density.

What is claimed is:

1. A method of investigating radioactive sources in a body of material provided at an investigation location, the body of material comprising a plurality of samples, the method comprising detecting a portion of the emissions arising from a sample, the detected portion relating to a detected level, the detected level being corrected according to a correction method to give a corrected level, the method being repeated for one or more of the other samples, the correction method for one or more of the samples comprising providing a generator of radioactive emissions and detecting the radioactive emissions from the generator with the sample at the investigating location, the relationship of the emissions detected with the sample at the investigating location to the emissions which would be detected with the sample absent from the investigating location determining a characteristic of the sample, the determined characteristic being a function of the density of the sample, the determined characteristic being employed as a factor in the correction method used for that sample to obtain the corrected level.

2. A method according to claim 1 in which the relationship of the emissions detected with the sample at the investigating location to the emissions which would be detected with the sample absent the investigating location is the ratio of the respective count rates for the detectors.

3. A method according to claim 1 in which the relationship equates to $-\ln(R/R_o)$, where R is the rate at which the emissions are detected with the sample in place and $R_o$ is the rate of emissions which would be detected without the sample in place.

4. A method according to claim 1 in which the characteristic is a function of the effective amount of material in the sample relative to one or more other samples.

5. A method according to claim 1 in which the characteristic is a function of the effective amount of material in a sample and the amount of material in a sample is a function of the effect on transmission of generator emissions by that sample, the total amount of material being proportional to the effects of all the samples, the fraction of the total material in a particular sample being a function of that sample's effect on transmission to the sum of all the effects.

6. A method according to claim 5 in which the fraction of the total material in a particular sample is a ratio of that sample's effect on the transmission to the sum of all the effects of the samples on the transmission.

7. A method according to claim 5 in which the amount of material in a sample, Vs, equates to: $-\ln(R/R_o)$.

8. A method according to claim 7 in which the total amount of material in the body of material is proportional to the sum of each sample amount, $\Sigma Vs$.

9. A method according to claim 7 in which the fraction of the body of material in a given sample is $Vs/\Sigma Vs$.

10. A method according to claim 1 in which the characteristic is determined based on a number of variables including one or more of, and ideally all of:

i) the total mass of the body of material, M;
ii) the total volume of the body of material, V;
iii) the total number of samples forming the body of material, N;
iv) the amount of material in a given sample, Vs;
v) the sum of all the values proportional to the amounts of material in the sample volumes, $\Sigma Vs$;
vi) the density of the sample.

11. A method according to claim 1 where the characteristic is determined based on the equation:

$$\rho = (N \times M/V) \times (Vs/\Sigma Vs).$$

12. A method of investigating radioactive sources in a body of material provided at an investigation location, the body of material comprising a plurality of samples, the method comprising detecting a portion of the emissions arising from a sample, the detected portion relating to a detected level, the detected level being corrected according to a correction method to give a corrected level, the method being repeated for one or more of the other samples, the correction method for one or more of the samples comprising providing a generator of radioactive emissions and detecting the radioactive emissions from the generator with the sample at the investigating location, the relationship of the emissions detected with the sample at the investigating location to the emissions which would be detected with the sample absent from the investigating location determining a characteristic of the sample, the determined characteristic being employed as a factor in the correction method used for that sample to obtain the corrected level, the determined characteristic being based on the equation:

$$R = R_o \exp(-\mu\rho x)$$

where R is the rate at which the emissions are detected with the sample in place and $R_o$ is the rate of emissions which would be detected without the sample in place; $\mu$ is the mass attenuation coefficient; x is the thickness of the sample (between source and detector); and $\rho$ is the density of the sample.

13. A method according to claim 12 in which under the conditions of the investigation x and $\mu$ are substantially constant.

14. A method according to claim 12 in which x is kept constant by fixed relative generator, detector and sample positions.

15. A method according to claims 12 in which $\mu$ is substantially constant due to the energy of the generator emissions.

16. Apparatus for investigating radioactive sources in a body of material, the body of material comprising a plurality of samples, the apparatus comprising:

one or more detectors for detecting emissions from the sources, the detectors generating signals indicative of the emissions detected;

an investigating location into which the sample is introduced;

signal processing means for relating the detector signals to a detected level for the sources;

processing means providing a correction method for correcting the detected level for the sources to give a corrected level;

the apparatus further comprising:
a generator of radioactive emissions, at least a portion of the emissions entering the investigating location and, in uses, the sample;
one or more detectors for detecting the generator emissions with the sample at the investigating location;
processing means for determining a characteristic of the sample based on the relationship of emissions detected with the sample at the investigating location to emissions which would be detected with the sample absent, the determined characteristic being a function of the density of the sample, the characteristic being employed by the processing means as a factor in the correction method used for that sample to obtain the corrected level.

17. A method of investigating radioactive sources in a body of material provided at an investigation location, the body of material comprising a plurality of samples, the samples each being a slice which extends from one side of the body of material to the other side of the body of material, the method comprising;

detecting a portion of the emissions arising from a sample using a detector, the detected portion relating to a detected level, the detected level being corrected according to a correction method to give a corrected level, the method being repeated for the other samples forming the body of material; and the correction method for one or more of the samples comprising providing a generator of radioactive emissions of energy greater than 400 keV, detecting the radioactive emissions from the generator with the sample at the investigation location, detecting the radioactive emissions from the generator with the sample absent from the investigation location, the relationship of the emissions detected with the sample at the investigation location to the emissions detected with the sample absent from the investigation location determining a characteristic of the sample, the relationship being based on the ratio of that count rate for emissions detected with the sample at the investigation location to that count rate for emissions detected with the sample absent from the investigation location, the determined characteristic being a function of the sample, the determined characteristic being employed as a factor in the correction method used for that sample to obtain the corrected level, the relative position of the generator, investigation location and detector being fixed during the method.

* * * * *